US011221997B2

(12) United States Patent
Mi

(10) Patent No.: US 11,221,997 B2
(45) Date of Patent: Jan. 11, 2022

(54) ON-DEMAND CREATION AND ACCESS OF A VIRTUAL FILE SYSTEM

(71) Applicant: Advanced New Technologies Co., Ltd., George Town (KY)

(72) Inventor: Wenjie Mi, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 544 days.

(21) Appl. No.: 15/813,389

(22) Filed: Nov. 15, 2017

(65) Prior Publication Data

US 2018/0075060 A1    Mar. 15, 2018

Related U.S. Application Data

(63) Continuation of application No. PCT/CN2016/084224, filed on Jun. 1, 2016.

(30) Foreign Application Priority Data

Jun. 8, 2015 (CN) .......................... 201510309492.7

(51) Int. Cl.
*G06F 16/10* (2019.01)
*G06F 16/188* (2019.01)
*G06F 16/16* (2019.01)
*G06F 16/182* (2019.01)
(Continued)

(52) U.S. Cl.
CPC .......... *G06F 16/188* (2019.01); *G06F 16/162* (2019.01); *G06F 16/183* (2019.01); *H04L 29/08* (2013.01)

(58) Field of Classification Search
None
See application file for complete search history.

(56) References Cited

U.S. PATENT DOCUMENTS 9,710,481 B1 *  7/2017  Darling, Jr. ......... G06F 16/1847
10,095,707 B1 * 10/2018  Whitmer ............. G06F 16/1844
2013/0268499 A1  10/2013  Kirihata et al.
(Continued)

FOREIGN PATENT DOCUMENTS

CN    101398821 A    4/2009
CN    101459669 A    6/2009
(Continued)

OTHER PUBLICATIONS

International Preliminary Report on Patentability in International Application No. PCT/CN2016/084224, dated Dec. 12, 2017, 10 pages (with English Translation).
(Continued)

*Primary Examiner* — Kristopher Andersen
(74) *Attorney, Agent, or Firm* — Fish & Richardson P.C.

(57) ABSTRACT

A first creation request for creating a virtual file system corresponding to a first storage device in an operating system is received. The virtual file system corresponding to the first storage device is created in a preset path in the operating system using a Filesystem in Userspace (FUSE) utility in the operating system. A first access request for the preset path is received. The first access request is sent to the virtual file system when the first access request for the preset path is received, such that the virtual file system accesses the first storage device according to the first access request.

14 Claims, 6 Drawing Sheets

(51) Int. Cl.
*H04L 29/08* (2006.01)
*H04L 29/00* (2006.01)

(56) References Cited

U.S. PATENT DOCUMENTS

| | | |
|---|---|---|
| 2014/0108755 A1 | 4/2014 | Lue et al. |
| 2014/0258222 A1* | 9/2014 | Guo .................. G06F 16/172 |
| | | 707/610 |
| 2014/0344224 A1 | 11/2014 | LeBert et al. |

FOREIGN PATENT DOCUMENTS

| | | |
|---|---|---|
| CN | 102682129 A | 9/2012 |
| CN | 103106260 A | 5/2013 |
| CN | 103279521 | 9/2013 |
| CN | 104407946 | 3/2015 |
| CN | 104408053 | 3/2015 |
| CN | 104580517 | 4/2015 |
| CN | 102841915 | 10/2015 |
| JP | 2009223699 | 10/2009 |
| JP | 2010237939 | 10/2010 |
| JP | 2011216013 | 10/2011 |
| JP | 5400889 | 1/2014 |
| KR | 20130101776 | 9/2013 |
| WO | WO 2011121746 | 10/2011 |

OTHER PUBLICATIONS

International Search Report of the International Searching Authority issued in International Application No. PCT/CN2016/084224 dated Aug. 24, 2016; 8 pages.
Yongsheng, "Design and Implementation of a User Space File System Based on FUSE," China Masters' Thesis Full Text Database, 2012, 90 pages (with English Abstract).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
European Extended Search Report in European Application No. 16806736.1, dated Dec. 13, 2018, 9 pages.
Singaporean Search Report in Singaporean Application No. 11201709815T, dated Dec. 5, 2018, 8 pages.
Wikipedia [online], "Filesystem in Userspace," May 30, 2015, [retrieved on Dec. 6, 2018], retrieved from: URL<https://en.wikipedia.org/w/index.php?title=Filesystem_in_Userspace&oldid=664776514>, 5 pages.
Wikipedia [online], "AmigaOS Manual: AmigaDOS Command Reference", Apr. 22, 2014, retrieved on May 14, 2020, retrieved from: URL <https://wiki.amigaos.net/w/index.php?title=AmigaOS_Manual:_AmigaDOS_Command_Reference&oldid=7536#AS-SIGN>, 44 pages.
Unknown, "Amazon S3 with S3FS and Fuse. Script to Unmount and Mount," dated Aug. 14, 2013, 2 pages.

* cited by examiner

ON-DEMAND CREATION AND ACCESS OF A VIRTUAL FILE SYSTEM

This application is a continuation of PCT Application No. PCT/CN2016/084224, filed on Jun. 1, 2016, which claims priority to Chinese Patent Application No. 201510309492.7, filed on Jun. 8, 2015, and each application is incorporated by reference in its entirety.

BACKGROUND

The present disclosure relates to the field of computer technologies, and in particular, on-demand creation and access of a virtual file system.

At present, most enterprises use a Network Attached Storage (NAS) device to store data. A terminal may create a Network File System (NFS) in a path in an operating system of the terminal, and then mount the NAS device in the NFS. When receiving an access request for the NFS, the operating system determines that it is required to access the NAS device, and sends the access request to the NFS, such that the NFS accesses the NAS device through an NFS service. In this way, for the operating system of the terminal, the access mode in which the operating system accesses the NAS device is the same as the access mode in which the operating system accesses a local storage device of the terminal.

However, with the advancement of computer- and network-related technologies, an amount of data that needs to be stored by organizations (such as, enterprise, educational, and scientific entities) is growing with each passing day. When the amount of data increases, multiple NAS devices need to be configured at the same time to meet storage requirements. As configuration of an NAS device is costly, the need to configure NAS devices increase organization operating costs.

Therefore, in order to reduce the operating costs, more and more organizations begin to replace NAS devices with an open-source distributed file systems such as a HADOOP Distributed File System (HDFS) or a TAOBAO File System (TFS) to store data. However, when an operating system needs to access an open-source distributed file system, the operating system must accesses the open-source distributed file system through an application programming interface (API) provided by the open-source distributed file system.

SUMMARY

The present disclosure describes on-demand creation and access of a virtual file system.

In an implementation, a first creation request for creating a virtual file system corresponding to a first storage device in an operating system is received. The virtual file system corresponding to the first storage device is created in a preset path in the operating system using a Filesystem in Userspace (FUSE) utility in the operating system. A first access request for the preset path is received. The first access request is sent to the virtual file system when the first access request for the preset path is received, such that the virtual file system accesses the first storage device according to the first access request.

Conventionally, an access mode in which an operating system accesses a first storage device through an application programming interface (API) interface provided by the first storage device is different from the access mode in which the operating system accesses a second storage device. As skilled persons need to compile in advance, in the operation system, a great number of applications for accessing the first storage device through the API interface provided by the first storage device, these efforts can result in high resource costs (for example, labor, computing equipment, and time).

However, in the present disclosure, a virtual file system corresponding to a first storage device is created in an operating system by using a FUSE utility in the operating system. When access to the first storage device is required, without accessing the first storage device through an API interface provided by the first storage device, the operating system only needs to send a first access request to a virtual file system such that the virtual file system accesses the first storage device according to the first access request. In this way, for the operating system, the access mode in which the operating system accesses the first storage device is the same as the access mode in which the operating system accesses a local storage device. The access mode in which the operating system accesses the second storage device is also the same as the access mode in which the operating system accesses the local storage device. As a result, the access mode in which the operating system accesses the first storage device is the same as the access mode in which the operating system accesses the second storage device.

Therefore, the operating system can successfully access the first storage device by using an application originally configured for accessing the second storage device, and it is unnecessary for skilled persons to have to compile in advance, in the operation system, a great number of applications for accessing the first storage device through the API interface provided by the first storage device. As a result, resource costs can be reduced.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, application development costs can be reduced or avoided because skilled persons are not needed to compile in advance, in the operation system, a great number of applications for accessing a storage device through an API interface. Second, replacement of the new storage device is simplified because skilled persons are not needed to modify applications to access them. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes on-demand creation and access of virtual file systems, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1:
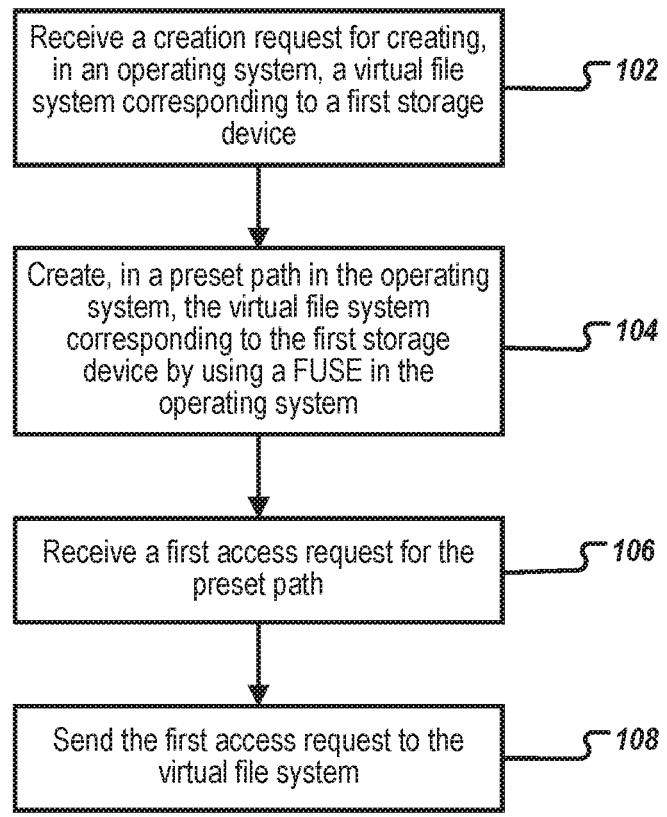
FIG. 1 is a flowchart illustrating an example of a method to create and access a virtual file system, according to an implementation of the present disclosure.

FIG. 1 is a flowchart illustrating an example of a method 100 to create and access a virtual file system, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, a first creation request is received for creating, in an operating system, a virtual file system corresponding to a first storage device. For example, the first storage device can be an open-source distributed file system such as a HADOOP Distributed File System (HDFS) or a TAOBAO File System (TFS). The operating system can be an operating system such as LINUX. When needing to access a first storage device, for example, a user may input a first creation request for creating, when submitted to the operating system, a virtual file system corresponding to the first storage device. In some implementations, the first creation request can be received from an application on a mobile device. In some implementations, the first creation request can be received through an interface on a web page. In some implementations, a loop can occur in this step during which a determination is made whether the request has been received. From 102, method 100 proceeds to 104.

At 104, the virtual file system corresponding to the first storage device is created in a preset path in the operating system by using a Filesystem in Userspace (FUSE) utility. For example, when the first creation request is received, it is determined whether a network file system corresponding to a second storage device, such as a Network Attached Storage (NAS) device, is mounted in the operating system. When the network file system corresponding to the second storage device is mounted in the operating system, a path for mounting, in the operating system, the network file system corresponding to the second storage device is acquired as the preset path. The network file system corresponding to the second storage device and mounted in the operating system is dismounted. Then, the virtual file system corresponding to the first storage device is created in the preset path in the operating system by using a FUSE utility. When the network file system corresponding to the second storage device is not mounted in the operating system, any path that is not occupied in the operating system can be used as the preset path. Afterwards, the virtual file system corresponding to the first storage device can be created in the preset path in the operating system by using a FUSE utility. From 104, method 100 proceeds to 106.

At 106, a first access request for the preset path is received. For example, after the operating system completes creation of the virtual file system, in the preset path, of the virtual file system corresponding to the first storage device, the user may need to access the first storage device. As a result, the user may input an access request for accessing the preset path, and the access request can be submitted to the operating system. In some implementations, a loop can occur in this step during which a determination is made whether the request has been received. From 106, method 100 proceeds to 108.

At 108, the first access request is sent to the virtual file system. For example, the virtual file system can access the first storage device according to the access request. In this way, the access mode in which the operating system accesses the first storage device is the same as the access mode in which the operating system accesses a local storage device.

In existing systems outside the present disclosure, the access mode in which an operating system accesses a first storage device through an API interface provided by the first storage device is different from the access mode in which the operating system accesses a second storage device. Skilled persons need to compile, in advance in the operation system, a great number of applications for accessing the first storage device through the API interface provided by the first storage device, thereby inducing high labor costs. However, in implementations of the present disclosure, because the access mode in which the operating system accesses the second storage device is the same as the access mode in which the operating system accesses the local storage device, the access mode in which the operating system accesses the first storage device is the same as the access mode in which the operating system accesses the second storage device. After 108, method 100 stops.

Figure 2:
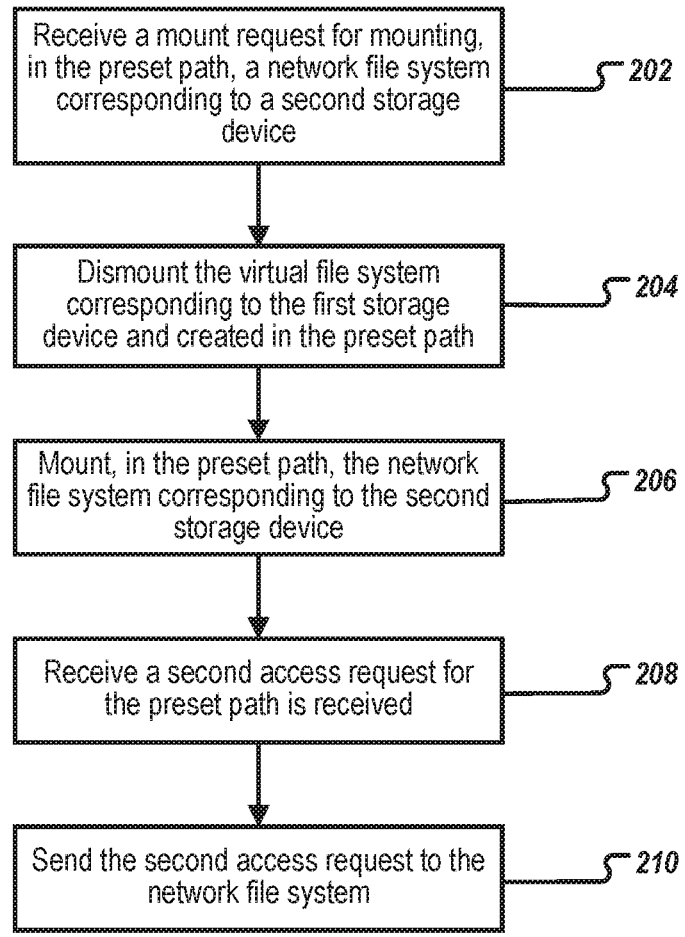
FIG. 2 is a flowchart illustrating an example of a method to create and access a virtual file system, according to an implementation of the present disclosure.

FIG. 2 is a flowchart illustrating an example of a method 200 to create and access a virtual file system, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

In step 202, a mount request for mounting, in a preset path, a network file system corresponding to a second storage device is received. The second storage device can be, for example, an NAS device. In some implementations, in order to avoid wasting paths of the operating system, the path for mounting the network file system in the operating system is the same as the path for creating the virtual file system in the operating system. However, in the same path of the operating system, the network file system and the virtual file system cannot exist at the same time. In some implementations, a loop can occur in this step during which a determination is made whether the request has been received.

Therefore, when it is required to access the first storage device, if the network file system corresponding to the second storage device has been mounted in the preset path, the network file system corresponding to the second storage device and mounted in the preset path needs to be dismounted, and then the virtual file system corresponding to the first storage device is created in the preset path, such that the first storage device can be accessed. Moreover, when it is required to access the second storage device, if the virtual file system corresponding to the first storage device is created in the preset path at this time, the virtual file system corresponding to the first storage device and created in the preset path needs to be dismounted, and then the network file system corresponding to the second storage device is mounted in the preset path, such that the second storage device can be accessed.

After the virtual file system corresponding to the first storage device is created in the preset path in the operating system, if the user needs to access the second storage device, a user needs to mount the network file system corresponding to the second storage device in the preset path of the operating system. The user may input a mount request for mounting, in the preset path of the operating system, a network file system corresponding to a second storage device, and submit the mount request to the operating system. From 202, method 200 proceeds to 204.

At 204, the virtual file system corresponding to the first storage device and created in the preset path is dismounted. Referring again to step 104 of method 100, the virtual file system corresponding to the first storage device is created in the preset path in the operating system by using the FUSE utility. Here in step 204, a process of the FUSE may be closed, thereby dismounting the virtual file system corresponding to the first storage device and created in the preset path. From 204, method 200 proceeds to 206.

At 206, the network file system corresponding to the second storage device is mounted in the preset path. For example, an NFS corresponding to the NAS device may be mounted in the preset path. From 206, method 200 proceeds to 208.

At 208, a second access request for the preset path is received. For example, after the operating system has completely mounted, in the preset path, the network file system corresponding to the second storage device, if the user needs to access the second storage device, the user may input an access request for accessing the preset path, and submit the access request to the operating system. For example, when the user needs to access the second storage device, the user may input an access instruction for accessing the preset path, and the access instruction can be submitted to the operating system. In some implementations, a loop can occur in this step during which a determination is made whether the request has been received. From 208, method 200 proceeds to 210.

At 210, the second access request is sent to the network file system. For example, based on the request, the network file system can access the second storage device according to the second access request. After 210, method 200 stops.

Figure 3:
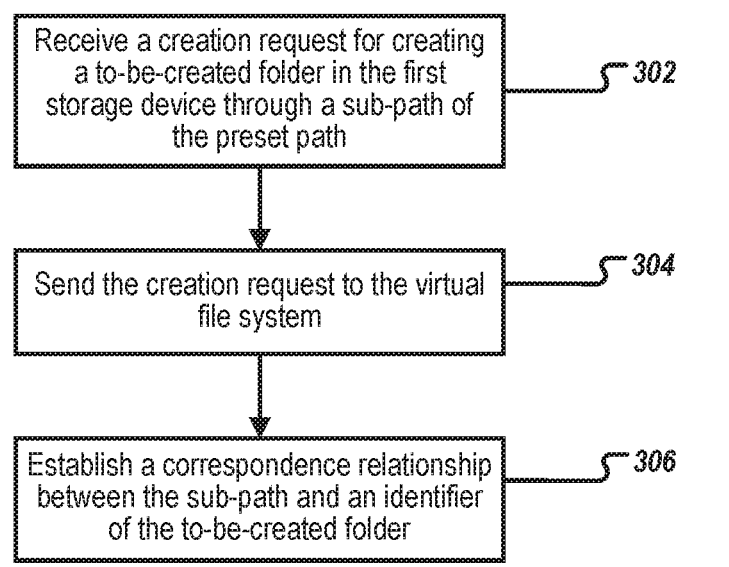
FIG. 3 is a flowchart illustrating an example of a method to create and access a virtual file system, according to an implementation of the present disclosure.
Figure 3:

FIG. 3 is a flowchart illustrating an example of a method 300 to create and access a virtual file system, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, a creation request for creating a to-be-created folder in the first storage device through a sub-path of the preset path is received. For example, the creation request can include an identifier of the to-be-created folder. When needing to store file content in the first storage device, for example, the user can first create a folder in the first storage device, and then store the file content in the created folder. Therefore, when needing to create a folder in the first storage device through a sub-path of the preset path, the user may input a creation request that is used for creating the to-be-created folder in the first storage device through the sub-path of the preset path and includes the identifier of to-be-created folder, and the creation request can be submitted to the operating system. The identifier of the folder can be a name, a number, or some other identifier. In some implementations, a loop can occur in this step during which a determination is made whether the request has been received. From 302, method 300 proceeds to 304.

At step 304, the creation request is sent to the virtual file system, such that the virtual file system creates the to-be-created folder in the first storage device according to the identifier of the to-be-created folder. After receiving the creation request, the virtual file system can extract the identifier of the to-be-created folder from the creation request. The virtual file system can then create the to-be-created folder in the first storage device according to the identifier of the to-be-created folder. In this way, the operating system's mode of creating a folder in the first storage device can be the same as the operating system's mode of creating a folder in a local storage device. Thereafter, a notification message for notifying creation completion of the to-be-created folder in the first storage device can be sent by the operating system. From 304, method 300 proceeds to 306.

At 306, a correspondence relationship between the sub-path and the identifier of the to-be-created folder is established. For example, a correspondence relationship between a preset sub-path and an identifier of a folder can be acquired. The sub-path and the identifier of the to-be-created folder can be included in a record. The record can be stored in the correspondence relationship between the preset sub-path and the identifier of the folder. The correspondence relationship between the preset sub-path and the identifier of the folder can be stored in a shared device, such that another operating system may also acquire, from the shared device, the correspondence relationship. After 306, method 300 stops.

Figure 4:
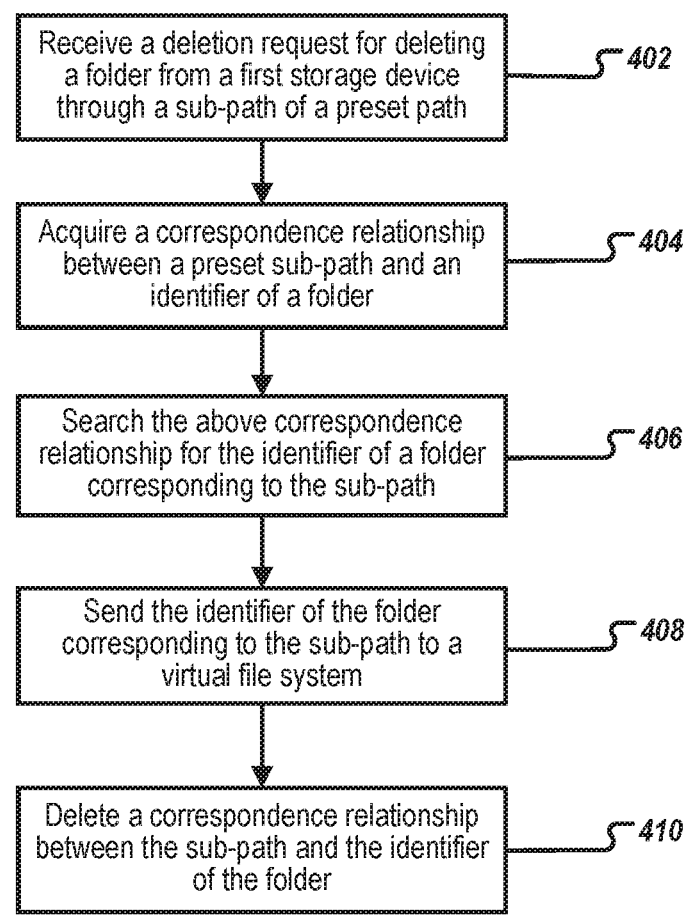
FIG. 4 is a flowchart illustrating an example of a method to create and access a virtual file system, according to an implementation of the present disclosure.

FIG. 4 is a flowchart illustrating an example of a method 400 to create and access a virtual file system, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a deletion request is received for deleting a folder from a first storage device through a sub-path of a preset path. For example, when needing to delete the folder from the first storage device through a sub-path of the preset path, the user can input a deletion instruction that is submitted to the operation system for deleting the folder from the first storage device through the sub-path of the preset path. In some implementations, a loop can occur in this step during which a determination is made whether the request has been received. From 402, method 400 proceeds to 404.

At 404, a correspondence relationship between a preset sub-path and an identifier of a folder is acquired. For example, the identifier of the folder can be a name, a number, or some other identifier. From 404, method 400 proceeds to 406.

At 406, the correspondence relationship is searched for the identifier of a folder corresponding to the sub-path. For example, the search can uses a record including the sub-path that is acquired from the correspondence relationship, and the identifier of the folder can be acquired from the record. From 406, method 400 proceeds to 408.

At 408, the identifier of the folder corresponding to the sub-path is sent to a virtual file system, such that the virtual file system deletes a folder corresponding to the identifier of the folder from the first storage device. For example, after receiving the identifier of the folder, the virtual file system can delete, from the first storage device, the folder corresponding to the identifier of the folder. In this way, the deletion mode in which the operating system deletes the folder from the first storage device is the same as the deletion mode for deleting the folder from a local storage device. A notification message for notifying completion of deleting the folder corresponding to the identifier of the folder from the first storage device can be sent by the operating system. From 408, method 400 proceeds to 410.

At 410, a correspondence relationship between the sub-path and the identifier of the folder is deleted. For example, a record including the identifier of the folder can be deleted from the correspondence relationship between a preset sub-path and an identifier of a folder. This can delete the correspondence relationship between the sub-path and the identifier of the folder.

Figure 5:
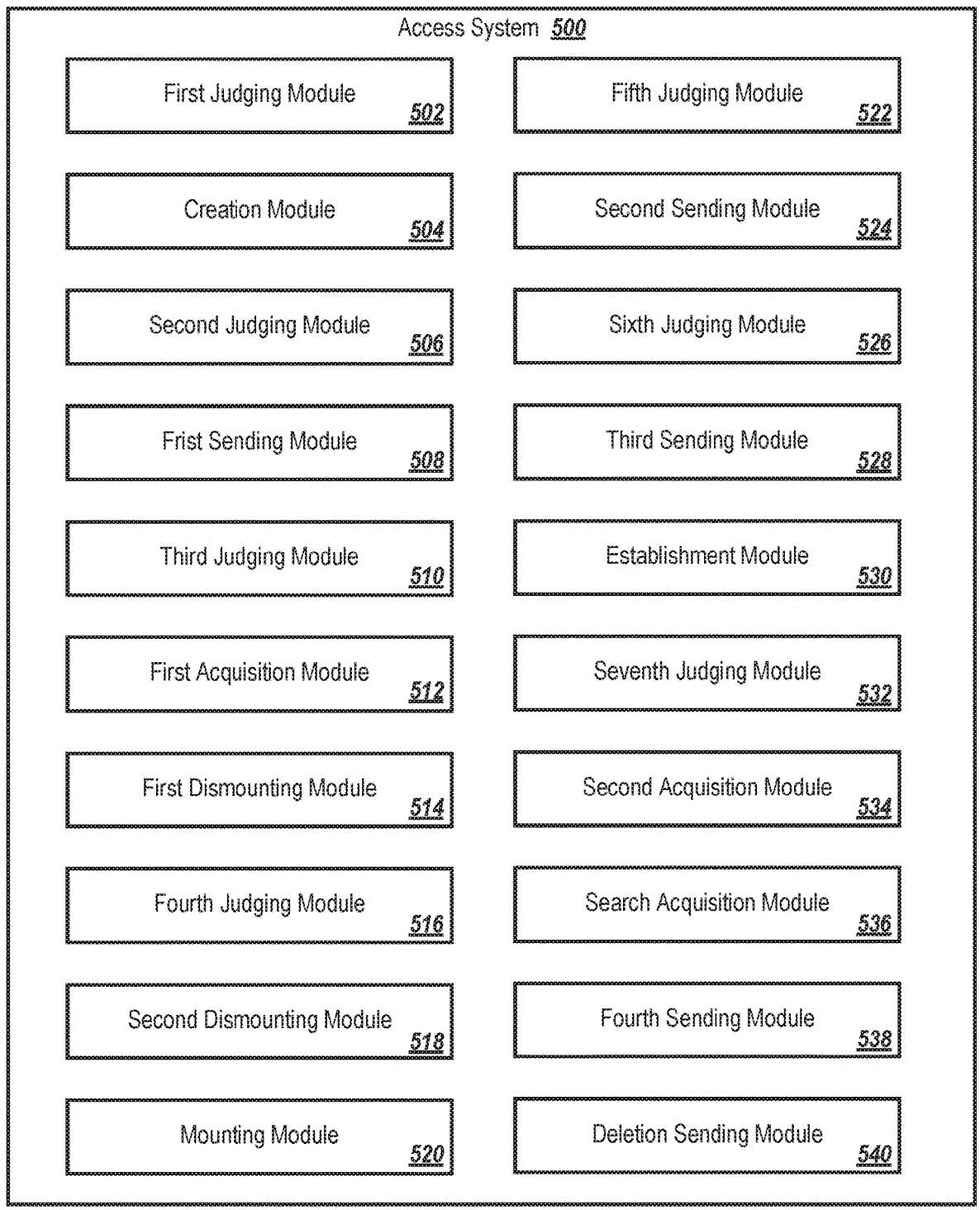
FIG. 5 is a block diagram illustrating an example of a computer-implemented system to create and access a virtual file system, according to an implementation of the present disclosure.

FIG. 5 is a block diagram illustrating an example of a computer-implemented access system 500 to create and access a virtual file system, according to an implementation of the present disclosure. Modules 502-540 of the access system 500 are configured to perform various operations associated with virtual file systems.

A first judging module 502 is configured to determine whether a first creation request is received for creating, in an operating system, a virtual file system corresponding to a first storage device. A creation module 504 is configured to create, in a preset path in the operating system, the virtual file system corresponding to the first storage device by using a FUSE utility when the first creation request is received. A second judging module 506 is configured to determine whether a first access request for the preset path is received. A first sending module 508 is configured to send the first access request to the virtual file system when the first access request for the preset path is received, such that the virtual file system accesses the first storage device according to the first access request.

In an example scenario, a creation request is received for creating, in the operating system, a virtual file system corresponding to a first storage device. The virtual file system corresponding to the first storage device can be created in the operating system, for example, by using a FUSE utility. A first access request for a preset path can be received, and the first access request can be sent to the virtual file system.

In existing systems outside the present disclosure, the access mode in which the operating system accesses the first storage device through an API interface provided by the first storage device may be different from the access mode in which an operating system accesses a second storage device. This typically requires that skilled persons need to compile in advance, in the operation system, a great number of applications for accessing the first storage device through the API interface provided by the first storage device.

In some implementations, a virtual file system corresponding to a first storage device is created in the operating system by using a FUSE utility. When it is required to access the first storage device, without accessing the first storage device through an API interface provided by the first storage device, the operating system only needs to send a first access request to the virtual file system. In this way, the access mode in which the operating system accesses the first storage device is the same as the access mode in which the operating system accesses a local storage device. The same access mode can be used when the operating system accesses a second and subsequent storage devices.

The access system 500 further includes additional modules for performing operations that can support the steps of method 200. A third judging module 510 configured to determine whether a network file system corresponding to a second storage device is mounted in the operating system. A first acquisition module 512 is configured to acquire a path that is in the operating system and for mounting the network file system corresponding to the second storage device as a preset path when the network file system corresponding to the second storage device is mounted in the operating system. A first dismounting module 514 is configured to dismount the network file system corresponding to the second storage device and mounted in the operating system. In this case, the creation module 504 is also further configured to perform the step of creating, in a preset path in the operating system, the virtual file system corresponding to the first storage device by using the FUSE utility. A fourth judging module 516 is configured to determine whether a mount request for mounting, in the preset path, the network file system corresponding to the second storage device is received. A second dismounting module 518 is configured to dismount the virtual file system corresponding to the first storage device and created in the preset path, when the mount request is received. A mounting module 520 is configured to mount, in the preset path, the network file system corresponding to the second storage device. A fifth judging module 522 is configured to determine whether a second access request for the preset path is received. A second sending module 524 is configured to send the second access request to the network file system when the second access request for the preset path is received, such that the network file system accesses the second storage device according to the second access request.

The access system 500 further includes additional modules for performing operations that can support the steps of method 300. A sixth judging module 526 is configured to determine whether a second creation request for creating a to-be-created folder in the first storage device through a sub-path of the preset path is received, the second creation request including an identifier of the to-be-created folder. A third sending module 528 is configured to send the second creation request to the virtual file system when the second creation request is received, such that the virtual file system creates the to-be-created folder in the first storage device according to the identifier of the to-be-created folder. An establishment module 530 is configured to establish a correspondence relationship between the sub-path and the identifier of the to-be-created folder.

The access system 500 further includes additional modules for performing operations that can support the steps of method 400. A seventh judging module 532 is configured to determine whether a deletion request for deleting a folder from the first storage device through a sub-path of the preset path is received. A second acquisition module 534 is configured to acquire a correspondence relationship between a preset sub-path and an identifier of a folder when the deletion request is received. A search acquisition module 536 is configured to search the correspondence relationship for the identifier of a folder corresponding to the sub-path. A fourth sending module 538 is configured to send the identifier of the folder corresponding to the sub-path to the virtual file system, such that the virtual file system deletes the folder corresponding to the identifier of the folder from the first storage device. A deletion sending module 540 is configured to delete the correspondence relationship between the sub-path and the identifier of the folder.

Figure 6:
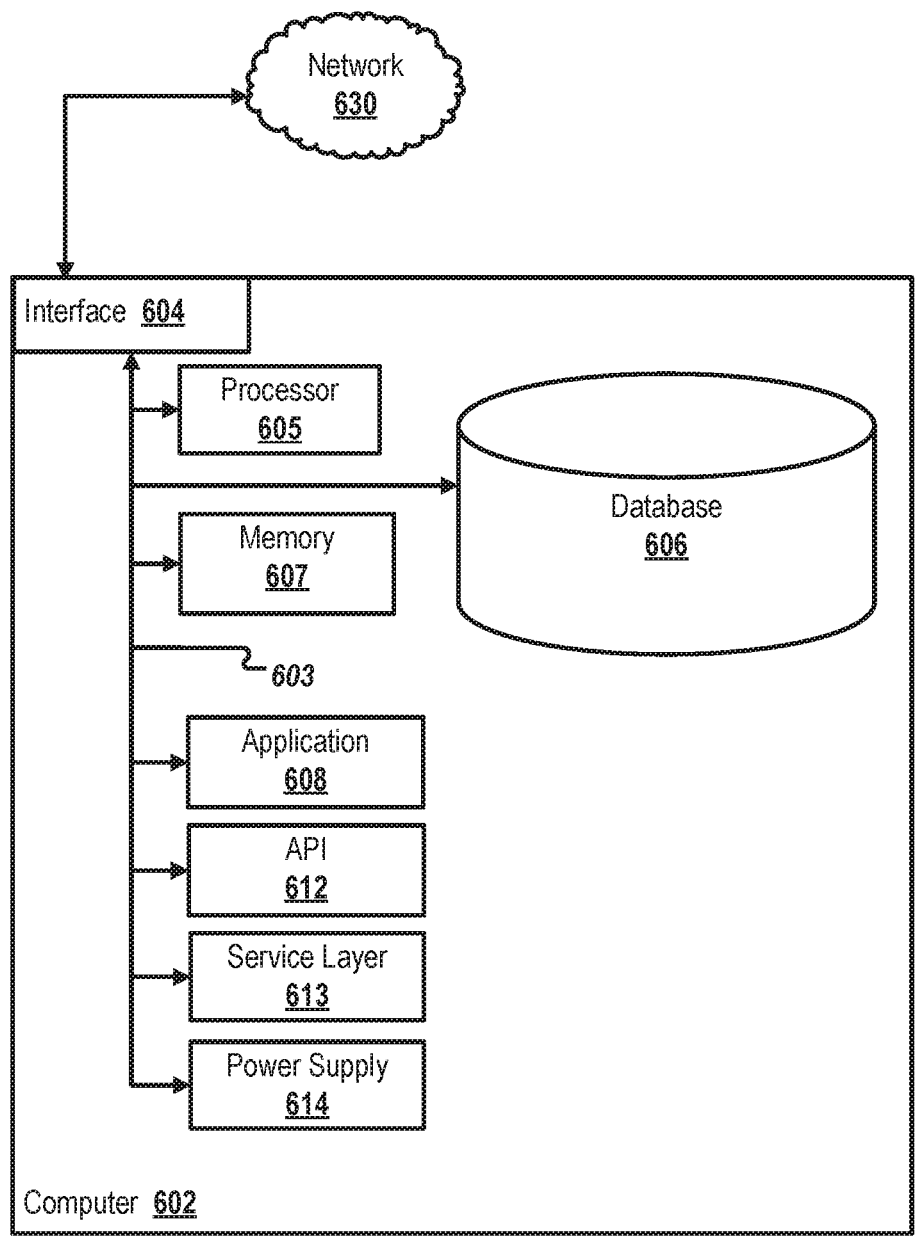
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented system 600 used to provide computational functionalities associated with described algorithms, methods, functions, processes, flows, and procedures, according to an implementation of the present disclosure. In the illustrated implementation, system 600 includes a computer 602 and a network 630.

The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can include an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a distributed computing system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

At a high level, the computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users (for example, from a command console or by another internal access method), external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an API 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and includes logic encoded in software, hardware, or a combination of software and hardware. More specifically, the interface 604 can include software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Described implementations of the subject matter can include one or more features, alone or in combination.

For example, in a first implementation, a computer-implemented method, comprising: receiving a first creation request for creating, in an operating system, a virtual file system corresponding to a first storage device; creating, in a preset path in the operating system, the virtual file system corresponding to the first storage device by using a FUSE utility in the operating system when the first creation request is received; receiving a first access request for the preset path; and sending the first access request to the virtual file system when the first access request for the preset path is received, such that the virtual file system accesses the first storage device according to the first access request.<as-is independent claim language for computer/software method put into a paragraph format>

The foregoing and other described implementations can each, optionally, include one or more of the following features:

A first feature, combinable with any of the following features, further comprising: determining whether a network file system corresponding to a second storage device is mounted in the operating system; acquiring a path that is in the operating system and for mounting the network file system corresponding to the second storage device as a preset path when the network file system corresponding to the second storage device is mounted in the operating system; dismounting the network file system corresponding to the second storage device and mounted in the operating system; and creating, in a preset path in the operating system, the virtual file system corresponding to the first storage device by using a FUSE utility in the operating system.

A second feature, combinable with any of the previous or following features, further comprising: receiving a mount request for mounting, in the preset path, the network file system corresponding to the second storage device; dismounting the virtual file system corresponding to the first storage device and created in the preset path, when the mount request is received; mounting, in the preset path, the network file system corresponding to the second storage device; receiving a second access request for the preset path; and sending the second access request to the network file system when the second access request for the preset path is received, such that the network file system accesses the second storage device according to the second access request.

A third feature, combinable with any of the previous or following features, further comprising: receiving a second creation request for creating a to-be-created folder in the first storage device through a sub-path of the preset path, the second creation request including an identifier of the to-be-created folder; sending the second creation request to the virtual file system when the second creation request is received, such that the virtual file system creates the to-be-created folder in the first storage device according to the identifier of the to-be-created folder; and establishing a correspondence relationship between the sub-path and the identifier of the to-be-created folder.

A fourth feature, combinable with any of the previous or following features, further comprising: receiving a deletion request for deleting a folder from the first storage device through a sub-path of the preset path; acquiring a correspondence relationship between a preset sub-path and an identifier of a folder when the deletion request is received; searching the correspondence relationship for the identifier of a folder corresponding to the sub-path; sending the identifier of the folder corresponding to the sub-path to the virtual file system, such that the virtual file system deletes the folder corresponding to the identifier of the folder from the first storage device; and deleting the correspondence relationship between the sub-path and the identifier of the folder.

A fifth feature, combinable with any of the previous or following features, wherein the first creation request is received from an application on a mobile device.

A sixth feature, combinable with any of the previous or following features, wherein the first creation request is received through an interface on a web page.

In a second implementation, non-transitory, computer-readable medium storing one or more instructions executable by a computer system to perform operations comprising: receiving a first creation request for creating, in an operating system, a virtual file system corresponding to a first storage device; creating, in a preset path in the operating system, the virtual file system corresponding to the first storage device by using a FUSE utility in the operating system when the first creation request is received; receiving a first access request for the preset path; and sending the first access request to the virtual file system when the first access request for the preset path is received, such that the virtual file system accesses the first storage device according to the first access request.

The foregoing and other described implementations can each, optionally, include one or more of the following features:

A first feature, combinable with any of the following features, further comprising: determining whether a network file system corresponding to a second storage device is mounted in the operating system; acquiring a path that is in the operating system and for mounting the network file system corresponding to the second storage device as a preset path when the network file system corresponding to the second storage device is mounted in the operating system; dismounting the network file system corresponding to the second storage device and mounted in the operating system; and creating, in a preset path in the operating system, the virtual file system corresponding to the first storage device by using a FUSE utility in the operating system.

A second feature, combinable with any of the previous or following features, further comprising: receiving a mount request for mounting, in the preset path, the network file system corresponding to the second storage device; dismounting the virtual file system corresponding to the first storage device and created in the preset path, when the mount request is received; mounting, in the preset path, the network file system corresponding to the second storage device; receiving a second access request for the preset path; and sending the second access request to the network file system when the second access request for the preset path is received, such that the network file system accesses the second storage device according to the second access request.

A third feature, combinable with any of the previous or following features, further comprising: receiving a second creation request for creating a to-be-created folder in the first storage device through a sub-path of the preset path, the second creation request including an identifier of the to-be-created folder; sending the second creation request to the virtual file system when the second creation request is received, such that the virtual file system creates the to-be-created folder in the first storage device according to the identifier of the to-be-created folder; and establishing a correspondence relationship between the sub-path and the identifier of the to-be-created folder.

A fourth feature, combinable with any of the previous or following features, further comprising: receiving a deletion request for deleting a folder from the first storage device through a sub-path of the preset path; acquiring a correspondence relationship between a preset sub-path and an identifier of a folder when the deletion request is received; searching the correspondence relationship for the identifier of a folder corresponding to the sub-path; sending the identifier of the folder corresponding to the sub-path to the virtual file system, such that the virtual file system deletes the folder corresponding to the identifier of the folder from the first storage device; and deleting the correspondence relationship between the sub-path and the identifier of the folder.

A fifth feature, combinable with any of the previous or following features, wherein the first creation request is received from an application on a mobile device.

A sixth feature, combinable with any of the previous or following features, wherein the first creation request is received through an interface on a web page.

In a third implementation, a computer-implemented system, comprising: one or more computers; and one or more computer memory devices interoperably coupled with the one or more computers and having tangible, non-transitory, machine-readable media storing instructions, that when executed by the one or more computers, perform operations using methods comprising: receiving a first creation request for creating, in an operating system, a virtual file system corresponding to a first storage device; creating, in a preset path in the operating system, the virtual file system corresponding to the first storage device by using a FUSE utility in the operating system when the first creation request is received; receiving a first access request for the preset path; and sending the first access request to the virtual file system when the first access request for the preset path is received, such that the virtual file system accesses the first storage device according to the first access request.

The foregoing and other described implementations can each, optionally, include one or more of the following features:

A first feature, combinable with any of the following features, further comprising: determining whether a network file system corresponding to a second storage device is mounted in the operating system; acquiring a path that is in the operating system and for mounting the network file system corresponding to the second storage device as a preset path when the network file system corresponding to the second storage device is mounted in the operating system; dismounting the network file system corresponding to the second storage device and mounted in the operating system; and creating, in a preset path in the operating system, the virtual file system corresponding to the first storage device by using a FUSE utility in the operating system.

A second feature, combinable with any of the previous or following features, further comprising: receiving a mount request for mounting, in the preset path, the network file system corresponding to the second storage device; dismounting the virtual file system corresponding to the first storage device and created in the preset path, when the mount request is received; mounting, in the preset path, the network file system corresponding to the second storage device; receiving a second access request for the preset path; and sending the second access request to the network file system when the second access request for the preset path is received, such that the network file system accesses the second storage device according to the second access request.

A third feature, combinable with any of the previous or following features, further comprising: receiving a second creation request for creating a to-be-created folder in the first storage device through a sub-path of the preset path, the second creation request including an identifier of the to-be-created folder; sending the second creation request to the virtual file system when the second creation request is received, such that the virtual file system creates the to-be-created folder in the first storage device according to the identifier of the to-be-created folder; and establishing a correspondence relationship between the sub-path and the identifier of the to-be-created folder.

A fourth feature, combinable with any of the previous or following features, further comprising: receiving a deletion request for deleting a folder from the first storage device through a sub-path of the preset path; acquiring a correspondence relationship between a preset sub-path and an identifier of a folder when the deletion request is received; searching the correspondence relationship for the identifier of a folder corresponding to the sub-path; sending the identifier of the folder corresponding to the sub-path to the virtual file system, such that the virtual file system deletes the folder corresponding to the identifier of the folder from the first storage device; and deleting the correspondence relationship between the sub-path and the identifier of the folder.

A fifth feature, combinable with any of the previous or following features, wherein the first creation request is received from an application on a mobile device.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving a first creation request for creating, in an operating system, a virtual file system corresponding to a first storage device, the first storage device being an open-source distributed file system;
in response to receiving the first creation request,
determining whether a network file system corresponding to a second storage device is mounted in the operating system, the second storage device being a network attached storage;
in response to determining that the network file system is mounted in the operating system, acquiring a path, that the network file system is mounted at, as a preset path;
dismounting the network file system corresponding to the second storage device from the preset path;
creating, in the preset path in the operating system, the virtual file system corresponding to the first storage device by using a Filesystem in Userspace (FUSE) utility in the operating system;
receiving a first access request for the preset path;
sending the first access request to the virtual file system, such that the virtual file system accesses the first storage device according to the first access request and in a same access mode in which the operating system accesses a local storage device;
receiving a mount request for mounting, in the preset path, the network file system corresponding to the second storage device;
dismounting the virtual file system corresponding to the first storage device and created in the preset path, when the mount request is received;
mounting, in the preset path, the network file system corresponding to the second storage device:
receiving a second access request for the preset path; and
sending the second access request to the network file system when the second access request for the preset path is received, such that the network file system accesses the second storage device according to the second access request.

2. The computer-implemented method of claim 1, further comprising:
receiving a second creation request for creating a to-be-created folder in the first storage device through a sub-path of the preset path, the second creation request including an identifier of the to-be-created folder;
sending the second creation request to the virtual file system when the second creation request is received, such that the virtual file system creates the to-be-created folder in the first storage device according to the identifier of the to-be-created folder; and
establishing a correspondence relationship between the sub-path and the identifier of the to-be-created folder.

3. The computer-implemented method of claim 1, further comprising:
receiving a deletion request for deleting a folder from the first storage device through a sub-path of the preset path;
acquiring a correspondence relationship between a preset sub-path and an identifier of a folder when the deletion request is received;
searching the correspondence relationship for the identifier of a folder corresponding to the sub-path;
sending the identifier of the folder corresponding to the sub-path to the virtual file system, such that the virtual file system deletes the folder corresponding to the identifier of the folder from the first storage device; and
deleting the correspondence relationship between the sub-path and the identifier of the folder.

4. The computer-implemented method of claim 1, wherein the first creation request is received from an application on a mobile device.

5. The computer-implemented method of claim 1, wherein the first creation request is received through an interface on a web page.

6. A non-transitory, computer-readable medium storing one or more instructions executable by a computer system to perform operations comprising:
receiving a first creation request for creating, in an operating system, a virtual file system corresponding to a first storage device, the first storage device being an open-source distributed file system;

in response to receiving the first creation request,
 determining whether a network file system corresponding to a second storage device is mounted in the operating system, the second storage device being a network attached storage;
 in response to determining that the network file system is mounted in the operating system, acquiring a path, that the network file system is mounted at, as a preset path;
 dismounting the network file system corresponding to the second storage device from the preset path;
 creating, in the preset path in the operating system, the virtual file system corresponding to the first storage device by using a Filesystem in Userspace (FUSE) utility in the operating system;
 receiving a first access request for the preset path;
 sending the first access request to the virtual file system, such that the virtual file system accesses the first storage device according to the first access request and in a same access mode in which the operating system accesses a local storage device;
 receiving a mount request for mounting, in the preset path, the network file system corresponding to the second storage device;
 dismounting the virtual file system corresponding to the first storage device and created in the preset path, when the mount request is received;
 mounting, in the preset path, the network file system corresponding to the second storage device;
 receiving a second access request for the preset path; and
 sending the second access request to the network file system when the second access request for the preset path is received, such that the network file system accesses the second storage device according to the second access request.

7. The non-transitory, computer-readable medium of claim 6, the operations further comprising:
 receiving a second creation request for creating a to-be-created folder in the first storage device through a sub-path of the preset path, the second creation request including an identifier of the to-be-created folder;
 sending the second creation request to the virtual file system when the second creation request is received, such that the virtual file system creates the to-be-created folder in the first storage device according to the identifier of the to-be-created folder; and
 establishing a correspondence relationship between the sub-path and the identifier of the to-be-created folder.

8. The non-transitory, computer-readable medium of claim 6, the operations further comprising:
 receiving a deletion request for deleting a folder from the first storage device through a sub-path of the preset path;
 acquiring a correspondence relationship between a preset sub-path and an identifier of a folder when the deletion request is received;
 searching the correspondence relationship for the identifier of a folder corresponding to the sub-path;
 sending the identifier of the folder corresponding to the sub-path to the virtual file system, such that the virtual file system deletes the folder corresponding to the identifier of the folder from the first storage device; and
 deleting the correspondence relationship between the sub-path and the identifier of the folder.

9. The non-transitory, computer-readable medium of claim 6, wherein the first creation request is received from an application on a mobile device.

10. The non-transitory, computer-readable medium of claim 6, wherein the first creation request is received through an interface on a web page.

11. A computer-implemented system, comprising:
 one or more computers; and
 one or more computer memory devices interoperably coupled with the one or more computers and having tangible, non-transitory, machine-readable media storing instructions, that when executed by the one or more computers, perform operations comprising:
  receiving a first creation request for creating, in an operating system, a virtual file system corresponding to a first storage device, the first storage device being an open-source distributed file system;
  in response to receiving the first creation request,
   determining whether a network file system corresponding to a second storage device is mounted in the operating system, the second storage device being a network attached storage;
   in response to determining that the network file system is mounted in the operating system, acquiring a path, that the network file system is mounted at, as a preset path;
   dismounting the network file system corresponding to the second storage device from the preset path;
   creating, in the preset path in the operating system, the virtual file system corresponding to the first storage device by using a Filesystem in Userspace (FUSE) utility in the operating system;
   receiving a first access request for the preset path;
   sending the first access request to the virtual file system, such that the virtual file system accesses the first storage device according to the first access request and in a same access mode in which the operating system accesses a local storage device;
   receiving a mount request for mounting, in the preset path, the network file system corresponding to the second storage device;
   dismounting the virtual file system corresponding to the first storage device and created in the preset path, when the mount request is received;
   mounting, in the preset path, the network file system corresponding to the second storage device;
   receiving a second access request for the preset path; and
   sending the second access request to the network file system when the second access request for the preset path is received, such that the network file system accesses the second storage device according to the second access request.

12. The computer-implemented system of claim 11, the operations further comprising:
 receiving a second creation request for creating a to-be-created folder in the first storage device through a sub-path of the preset path, the second creation request including an identifier of the to-be-created folder;
 sending the second creation request to the virtual file system when the second creation request is received, such that the virtual file system creates the to-be-created folder in the first storage device according to the identifier of the to-be-created folder; and
 establishing a correspondence relationship between the sub-path and the identifier of the to-be-created folder.

13. The computer-implemented system of claim 11, the operations further comprising:
- receiving a deletion request for deleting a folder from the first storage device through a sub-path of the preset path;
- acquiring a correspondence relationship between a preset sub-path and an identifier of a folder when the deletion request is received;
- searching the correspondence relationship for the identifier of a folder corresponding to the sub-path;
- sending the identifier of the folder corresponding to the sub-path to the virtual file system, such that the virtual file system deletes the folder corresponding to the identifier of the folder from the first storage device; and
- deleting the correspondence relationship between the sub-path and the identifier of the folder.

14. The computer-implemented system of claim 11, wherein the first creation request is received from an application on a mobile device.

* * * * *

UNITED STATES PATENT AND TRADEMARK OFFICE
CERTIFICATE OF CORRECTION

PATENT NO. : 11,221,997 B2  
APPLICATION NO. : 15/813389  
DATED : January 11, 2022  
INVENTOR(S) : Wenjie Mi Page 1 of 1

It is certified that error appears in the above-identified patent and that said Letters Patent is hereby corrected as shown below:

In the Claims

Column 20, Line 21, in Claim 1, delete "device:" and insert -- device; --.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*